United States Patent Office 3,652,561
Patented Mar. 28, 1972

3,652,561
2,4,6-TRIS-(ALKYLTHIOALKYLTHIO)-
1,3,5-TRIAZINES
Martin Dexter, 416 Cedar Drive, Briarcliff Manor, N.Y.
10510, and Martin Knell, 4 Possum Road, Ossining,
N.Y. 10562
No Drawing. Filed July 23, 1969, Ser. No. 844,744
Int. Cl. C07d 55/50
U.S. Cl. 260—248 CS                         9 Claims

ABSTRACT OF THE DISCLOSURE 2,4,6-tris-(alkylthioalkylthio)-1,3,5-triazines are prepared by reacting cyanuric chloride, an alkylthioalkylmercaptan and a base. Said compounds are useful as stabilizers of organic material subject to oxidative deterioration and particularly as synergists in combination with other stabilizers.

DETAILED DESCRIPTION

This invention relates to 2,4,6-tris-(alkylthioalkylthio)-1,3,5-triazines and to organic compositions otherwise subject to oxidative deterioration stabilized by the incorporation therein of said types of compounds.

In particular the present invention pertains to the triazine compounds having the following general formula:

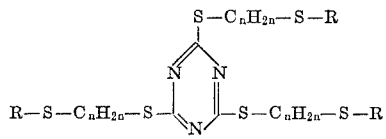

wherein

R is alkyl group having up to 24 carbon atoms
$n$ is an integer of 2 to 18.

By the group —$C_nH_{2n}$— is meant a straight chain or a branched chain alkylene group having from 2 to 18 carbon atoms. The alkylene groups can be attached to the sulfur atoms either through carbons which are adjacent to each other or through any other two non-adjacent carbons. Illustrative examples of such groups are ethylene, propylene, butylene, hexylene, decene, dodecene, tetradecene, octadecene and the like. The preferred group are those having from 2 to 6 carbon atoms and the most preferred is ethylene.

The R group in the above formula is an alkyl group having from 6 to 24 carbon atoms or an alkylthioalkane group, i.e., —$C_mH_{2m}$—S—R' where the integer $m$ is 1 to 6 and R' is an alkyl group having from 6 to 24 carbon atoms. Illustrative examples of the alkyl groups are hexyl, octyl, t-octyl, decyl, dodecyl, tridecyl, tetradecyl, hexadecyl, octadecyl, eicosyl, docosyl, tetracosyl and the like. Illustrative examples of alkylthioalkyl groups are hexylthioethyl, octylthioethyl, dodecylthioethyl, tridecylthioethyl, octadecylthioethyl, tetracosylthioethyl, dodecylthiobutyl, octadecylthiobutyl, hexylthiohexyl and the like. The alkyl groups in R and R' preferably have from 8 to 18 carbon atoms.

The 2,4,6-tris-(alkylthioalkylthio)-1,3,5-triazines of this invention can be prepared by a process comprising reacting cyanuric chloride, the appropriate mercaptan and a base in a solvent under an inert atmosphere. This process is described in greater detail in Examples 1 to 6 below.

The triazine compounds of the present invention are stabilizers of organic material normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene, poly-$\alpha$-olefins such as polyethylene, polypropylene, polybutylene, polyisoprene and the like, including copolymers of poly-$\alpha$-olefins, polyurethanes such as are prepared from polyols and organic polyisocyanates; polyamides such as polyhexamethylene adipamide and polycaprolactam, polyesters such as polymethylene or polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubrication oil of the aliphatic ester type, e.g., di(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like, fatty acids, soaps and the like.

In general the stabilizers of this invention are employed from about 0.005% to about 10% by weight of the stabilized composition. A particularly advantageous range for polyolefins, such as polypropylene is from about 0.1% to about 1%.

Although the compounds of this invention are useful as stabilizers per se, their greatest importance resides in the ability to vastly improve the effectiveness of numerous other compounds especially phenolic compounds, which are used as stabilizers for organic materials normally subject to deterioration. Thus, the compounds of this invention may be classified as "synergists" since when they are combined with stabilizers they exhibit the ability to increase the total stabilization to a degree far exceeding that which could be expected from the additive properties of the individual components. The stabilizers with which the compounds of this invention may be combined are, generally, phenolic triazines, phenolic phosphonates, phenolic esters and phenolic hydrocarbons.

Typical of the phenolic antioxidants whose stabilizing properties are improved by the addition of the compounds of the present invention, are the following:

CLASS A.—PHENOLIC TRIAZINE STABILIZERS 6-(4'-hydroxy-3'-methyl-5'-t-butylanilino)-2,4-bis
(n-octylthio)-1,3,5-triazine
6-(4'-hydroxy-3',5'-dimethylanilino)-2,4-bis(n-octyl-
thio)-1,3,5-triazine
6-(4'-hydroxy-3',5'-di-t-butylanilino)-2,4-bis(n-octyl-
thioethylthio)-1,3,5-triazine
2,4-bis-(4'-hydroxy-3',5'-di-t-butylphenoxy)-6-(n-octyl-
thio)-1,3,5-triazine
6-(4'-hydroxy-3',5'-di-t-butylanilino)-2,4-bis(phenoxy)-
1,3,5-triazine
6-(4'-hydroxy-3',5'-di-t-butylanilino)-4-(4''-hydroxy-3'',
5''-di-t-butylphenoxy)-2-(n-octylthio)-1,3,5-triazine
6-(4'-hydroxy-3'-t-butylphenyl)-2,4-bis-(n-octylthio-
ethylthio)-1,3,5-triazine
2,4,6-tris-(4'-hydroxy-3'-methyl-5'-t-butylphenoxy)-
1,3,5-triazine
2,4-bis-(4'-hydroxy-3',5'-di-t-butylphenoxy)-6-amino-
1,3,5-triazine
2,4-bis-(4'-hydroxy-3',5'-di-t-butylphenoxy)-6-dodecyl-
amino-1,3,5-triazine
6-(4'-hydroxy-3',5'-di-t-butylphenoxy)-2,4-bis(n-octyl-
thiopropylthio)-1,3,5-triazine
2,4-bis-(4'-hydroxy-3',5'-di-t-butylphenoxy)-6-(n-octa-
decylthio)-1,3,5-triazine 2,4-bis-(4'-hydroxy-3',5'-di-t-butylphenoxy)-6-(n-octyl-thiopropylthio)-1,3,5-triazine
2,4-bis-(4'-hydroxy-3',5'-di-t-butylphenoxy)-6-(n-octyl-thioethylthio)-1,3,5-triazine The above phenolic triazine stabilizers are more fully described in U.S. Pat. No. 3,255,191.

CLASS B.—PHENOLIC PHOSPHONATE STABILIZERS

Among the many phosphonate stabilizers whose properties are improved by the addition of a compound of the present invention are the di-(lower) alkyl phosphonates disclosed in U.S. Pat. No. 3,006,945. Particularly valuable phenolic phosphonates in this regard however are the di-(higher)alkyl phenyl phosphonates, i.e., having from 14 to 30 carbon atoms in each alkyl group. Representative of these are the following:

Di-n-octadecyl 3-t-butyl-4-hydroxy-5-methylbenzylphos-phonate
Di-n-octadecyl 1-(3',5'-di-t-butyl-4'-hydroxyphenyl)-ethanephosphonate
Di-n-octadecyl 3,5-t-butyl-4-hydroxybenzylphosphonate The above di-(higher) alkyl phenolic phosphonates are more fully described in the application of John Spivack, Ser. No. 308,345, filed Sept. 12, 1963, now abandoned.

CLASS C.—PHENOLIC ESTER STABILIZERS

Subclass C-1 n-Octadecyl 3,5-di-t-butyl-4-hydroxyphenylacetate
n-Octadecyl 3,5-di-t-butyl-4-hydroxybenzoate
Neo-dodecyl 3-(3',5'-di-t-butyl-4'-hydroxyphenyl)-propionate
Dodecyl 3-(3',5'-di-t-butyl-4'-hydroxyphenyl)-propionate
Ethyl α-(4-hydroxy-3,5-di-t-butylphenyl)isobutyrate

Subclass C-2

2-(n-octylthio)-ethyl 3',5'-di-t-butyl-4'-hydroxybenzoate
2-(n-octadecylthio)ethyl 3',5'-di-t-butyl-4'-hydroxy-phenylacetate
2-(2'-hydroxyethylthio)ethyl 3'',5''-di-t-butyl-4''-hydroxybenzoate
β,β'-Thiodiethyl bis(3,5-di-t-butyl-4-hydroxyphenyl-acetate)
Diethylene glycol bis-[3-(3',5'-di-t-butyl-4'-hydroxyphenyl)propionate]
Thio-bis-[ethylene 3-(3',5'-di-t-butyl-4'-hydroxyphenyl)propionate]
Stearamido N,N-bis-[ethylene 3-(3',5'-di-t-butyl-4'-hydroxyphenyl)propionate]
n-Butylimino N,N-bis-[ethylene 3-(3',5'-di-t-butyl-4-hydroxyphenyl)propionate
2-(2'-stearoyloxyethylthio)ethyl 7-(3''-methyl-5''-t-butyl-4''-hydroxyphenyl)heptanoate

Subclass C-3

1,2-propylene glycol bis-[3'-(3'',5''-di-t-butyl-4''-hydroxyphenyl)propionate]
Neopentylglycol bis-[3-(3',5'-di-t-butyl-4'-hydroxyphenyl)propionate]
Ethylene glycol bis-(3,5-di-t-butyl-4-hydroxyphenylacetate)
Glycerine-1-n-octadecanoate-2,3-bis-(3',5'-di-t-butyl-4-hydroxyphenylacetate)
Tetrakis-[3-(3',5'-di-t-butyl-4'-hydroxyphenyl)-propionyloxymethyl]methane
1,1,1-tris-[3'-(3'',5''-di-t-butyl-4''-hydroxyphenyl)propionyloxymethyl]propane
Sorbitol hexa-[3-(3',5'-di-t-butyl-4'-hydroxyphenyl)propionate]
2-stearoyloxyethyl 7'-(3''-methyl-5''-t-butyl-4''-hydroxyphenyl)heptanoate The above phenolic ester stabilizers of subclasses C-1, C-2, and C-3 are more fully described in U.S. Pat. No. 3,330,859, Ser. No. 354,464, filed Mar. 24, 1964, now U.S. Pat. No. 3,441,575, and Ser. No. 359,460, filed Apr. 13, 1964, now abandoned.

CLASS D.—PHENOLIC HYDROCARBON STABILIZERS 4,4'-butylidene-bis(6-t-butyl-m-cresol)
4,4'-thio-bis-(6-t-butyl-m-cresol)
4,4'-methylene-bis-(2,6-di-t-butylphenol)
2,2'-methylene-bis[4-hydroxy-6-(1-methylcyclohexyl)phenol]
1,3,5-trimethyl-2,4,6-tris-(4'-hydroxy-3',5'-di-t-butylbenzyl)benzene
2,6-di-t-butylphenol
1,1,3-tris-(5'-t-butyl-4'-hydroxy-2'-methylphenyl)-butane
4,4'-isopropylidene-bis-(2-t-butylphenol)

The above phenolic hydrocarbon stabilizers are known and many are commercially available.

In addition to one or more of the above phenolic stabilizers, it is often advantageous to employ other additives such as ultraviolet light absorbers, e.g., 2-hydroxy-4-methoxybenzophenone, 2 - (2' - hydroxy-5'-methylphenyl) benztriazole, etc.; various phosphite compounds such as trioctyl phosphite, dilauryl phosphite, tris(nonylphenyl) phosphite and the like. Such two, three or four component systems, when including a compound of the present invention, exhibit far superior properties to the additive properties of the individual components.

Other materials often added to such organic materials, depending upon the substrate, include pourpoint depressants, corrosion and rust inhibitors, metal deactivators, demulsifiers, antifoam agents, carbon black, accelerators, plasticizers, color stabilizers, heat stabilizers, dyes, pigments and the like.

The above listed stabilizers may be used in the concentration of from about 0.005 to 10 percent by weight of the stabilized composition. A particularly advantageous range is from about 0.1% to 1% by weight.

The following examples will further illustrate the nature of the present invention without being a limitation thereof.

EXAMPLE 1

Preparation of 2,4,6-tris-(n-octylthioethylthio)-1,3,5-triazine

A reaction vessel was charged with 9.2 g. of cyanuric chloride in 100 ml. of ethanol and 30.9 g. of n-octyl-thioethyl mercaptan. The vessel was flushed with nitrogen and cooled to 0° C. While stirring 3.45 g. of sodium metal dissolved in 200 ml. of ethanol were added to the reaction mixture. About 30 minutes after the addition had been completed, the reaction mixture was allowed to warm to 20° C. and then flooded with water. On standing and cooling the reaction product solidified and was extracted with ether. The ether extract was dried over magnesium sulfate, filtered and the ether stripped, yielding an almost colorless viscous liquid weighing 31.3 g. This product was redissolved in ether, dried, filtered and stripped again, yielding 30.7 g. of viscous liquid which crystallized on standing. This material had a melting point of 32° C.

*Elemental analysis.*—S, 27.7%. Found: S, 26.93%.

EXAMPLE 2

Preparation of 2,4,6-tris-(n-dodecylthioethylthio)-1,3,5-triazine

To the reaction vessel were added 18.45 g. of cyanuric chloride dissolved in 200 ml. of acetone and 78.6 g. of n-dodecylthioethyl mercaptan. The solution was cooled to 0° C. and to it was added 23.1 g. of sodium hydroxide as a 51.9% solution over a period of about 1 hour. The reaction mixture was allowed to warm to room temperature and stirred for an additional hour. Then the mixture was filtered and washed several times with large amounts of water. The excess water was removed from the solid by suction and the solid was dried over phosphoric anhydride. After drying the crude product weighed 85.1 g.

and had a melting point of 52.5° to 55.0° C. The crude product was dissolved in 1.4 liters of boiling isopropanol, cooled to about 50° C. at which time 375 ml. of hexane was added to prevent the separation of an oil. This solution was filtered and cooled slowly, yielding 64.8 g. of the product which had a melting point of 56–7° C.

*Elemental analysis.*—Theory (percent): C, 62.78; H, 10.19; S, 22.35. Found (percent): C, 62.93; H, 9.93; S, 22.42.

Employing the procedure described above, 2,4,6-tris-(n-hexylthioethylthio)-1,3,5-triazine is prepared by substituting n-hexylthioethylmercaptan in Example 2 above.

EXAMPLE 3

Preparation of 2,4,6-tris-(n-tetradecylthioethylthio)-1,3,5-triazine

Following the procedure described in Example 2 the product was prepared by reacting 6.14 g. of cyanuric chloride, 29.0 g. of n-tetradecylthioethylmercaptan and 4.0 g. of sodium hydroxide. The product had a melting point of 63.5–64.5° C.

*Elemental analysis.*—Theory (percent): C, 64.70; H, 10.54; S, 20.32. Found (percent): C, 64.67; H, 10.57; S, 20.16.

EXAMPLE 4

Preparation of 2,4,6-tris-(n-octadecylthioethylthio)-1,3,5-triazine

Employing the procedure described in Example 2, 55.35 g. of cyanuric chloride, 29.7 g. of n-octadecylthioethylmercaptan and 3.6 g. of sodium hydroxide were reacted to yield a crude product. This product was purified by recrystallization from methylene chloride, yielding the desired compound having a melting point of 75–76.5° C.

*Elemental analysis.*—Theory (percent): C, 67.86; H, 11.12; S, 17.26. Found (percent): C, 68.14; H, 11.03; S, 17.00.

2,4,6-tris-(n-tetracosylthioethylthio)-1,3,5-triazine and 2,4,6-tris-(n-octadecylthiohexylthio)-1,3,5-triazine are prepared by employing in Example 4 as a mercaptan respectively n-tetracosylthioethylmercaptan and n-octadecylthiohexylmercaptan.

EXAMPLE 5

Preparation of 2,4,6-tris-(n-octylthioethylthioethyl)-1,3,5-triazine

Following the procedure described in Example 2, 3.68 g. of cyanuric chloride, 16.00 g. of n-octylthioethylthioethylmercaptan and 4.62 g. of sodium hydroxide were reacted in about 80 ml. of acetone to give the crude product. This product was recrystallized from hot hexane yielding the purified product which has a melting point of 52–3° C.

*Elemental analysis.*—Calculated (percent): C, 53.55; H, 8.64; S, 33.00. Found (percent): C, 53.33; H, 8.43; S, 32.95.

EXAMPLE 6

Preparation of 2,4,6-tris-(tetracosylthioethylthioethylthio)-1,3,5-triazine

The product is obtained by employing in Example 5, n-tetracosylthioethylthioethylmercaptan.

OVEN AGING TEST

Unstabilized polypropylene powder (Hercules Profax 6501) is thoroughly blended with an antioxidant. The blended material is then milled on a two roller mill at 182° C. for 10 minutes after which time the stabilized polypropylene is sheeted from the mill and allowed to cool.

The milled polypropylene sheet is then cut into small pieces and pressed for 7 minutes on a hydraulic press at 218° C. and 2000 pounds per square inch pressure. The resultant sheet of 25 mil thickness is cut into small plaques and tested for resistance to accelerated aging in a forced draft oven at 150° C.

When unstabilized polypropylene is tested as described above, its oven life is about 3 hours.

The examples below show the effectiveness of the compounds of this invention as stabilizers per se, as well as the unusually high synergistic activity of said compounds when employed in combination with other stabilizers.

Following is the control data showing the oven aging life of polypropylene stabilized with the indicated compounds. The compounds are also used in combination with the compounds of this invention in stabilizing various substrates as shown in Examples 7 to 18.

CONTROL

| | Hrs. |
|---|---|
| 0.1% Compound (A): Dioctadecyl 3,5-di-t-butyl-4-hydroxybenzylphosphonate | 50 |
| 0.1% Compound (B): 2,4-bis-(3',5'-di-t-butyl-4'-hydroxyphenoxy)-6-(n-octylthio)-1,3,5-triazine | 120 |
| 0.1% Compound (C): 2,4-bis-(n-octylthio)-6-(3',5'-di-t-butyl-4'-hydroxyanilino)-1,3,5-triazine | 120 |
| 0.1% Compound (D): Tetra-[3-(3',5'-di-t-butyl-4'-hydroxyphenyl) propionyloxymethyl]methane | 600 |

EXAMPLE 7

| | Hrs. |
|---|---|
| 0.5% 2,4,6-tris-(n-octylthioethylthio)-1,3,5-triazine | 35 |
| 0.1% Compound (A): 0.5% 2,4,6-tris-(n-octylthioethylthio)-1,3,5-triazine | 1960 |
| 0.1% Compound (C): 0.5% 2,4,6-tris-(n-octylthioethylthio)-1,3,5-triazine | 1735 |

EXAMPLE 8

| | Hrs. |
|---|---|
| 0.5% 2,4,6-tris-(n-tetradecylthioethylthio)-1,3,5-triazine | 265 |
| 0.1% Compound (B): 2,4,6-tris-n-(-tetradecylthioethylthio)-1,3,5-triazine | 2810 |
| 0.25% Compound (B): 0.5% 2,4,6-tris-(n-tetradecylthioethylthio)-1,3,5-triazine | 3230 |

EXAMPLE 9

| | Hrs. |
|---|---|
| 0.5% 2,4,6-tris-(n-octadecylthioethylthio)-1,3,5-triazine | 30 |
| 0.1% Compound (B): 0.25% 2,4,6-tris-(n-octadecylthioethylthio)-1,3,5-triazine | 1020 |
| 0.1% Compound (B): 0.5% 2,4,6-tris-(n-octadecylthioethylthio)-1,3,5-triazine | 1720 |
| 0.25% Compound (B): 0.25% 2,4,6-tris-(n-octadecylthioethylthio)-1,3,5-triazine | 1330 |
| 0.1% Compound (D): 0.5% 2,4,6-tris-(n-octadecylthioethylthio)-1,3,5-triazine | 1330 |

EXAMPLE 10

| | Hrs. |
|---|---|
| 0.5% 2,4,6-tris-(n-octylthioethylthioethylthio)-1,3,5-triazine | 130 |
| 0.1% Compound (B): 0.25% 2,4,6-tris-(n-octylthioethylthioethylthio)-1,3,5-triazine | 1930 |
| 0.1% Compound (B): 0.5% 2,4,6-tris-(n-octylthioethylthioethylthio)-1,3,5-triazine | 2510 |

EXAMPLE 11

| | Hrs. |
|---|---|
| 0.5% 2,4,6-tris-(n-dodecylthioethylthio)-1,3,5-triazine | 180 |
| 0.1% Compound (B): 0.5% 2,4,6-tris-(n-dodecylthioethylthio)-1,3,5-triazine | 2570 |
| 0.1% Compound (B): 0.25% 2,4,6-tris-(n-dodecylthioethylthio)-1,3,5-triazine | 2190 |

Besides polypropylene, the above combinations of stabilizers are also effective when employed with polyethylene, polysytrene, polyurethane, polyvinylchloride, styrene-butadiene-acrylonitrile copolymer and polyamides.

In addition to the combinations of stabilizers shown above, the following combinations also exhibit excellent stabilization of polypropylene:

(a) 6-(4'-hydroxy-3'-methyl-5'-t-butylanilino)-2,4-bis-(n-octylthio)-1,3,5-triazine and 2,4,6-tris-(hexylthioethylthio)-1,3,5-triazine (b) 2,4-bis(n-octylthio)-6-(3',5',di-t-butyl-4'-hydroxyanilino)-1,3,5-triazine and 2,4,6-tris-(n-tetracosylthioethylthio)-1,3,5-triazine (c) n-Octadecyl 3-(3',5',-di-t-butyl-4'-hydroxyphenyl) propionate and 2,4,6-tris-(n-eicosylthioethylthio)-1,3,5-triazine (d) Di-n-octadecyl 3,5-di-t-butyl-4-hydroxybenzylphosphonate and 2,4,6-tris-(n-octadecylthioisopropylthio)-1,3,5-triazine (e) 2,4-bis(4'-hydroxy-3',5'-di-t-butylphenoxy)-6-(n-octylthioethylthio)-1,3,5-triazine and 2,4,6-tris-(n-octadecylthiobutylthio)-1,3,5-triazine (f) Tetrakis-[3-(3',5'-di-t-butyl-4'-hydroxphenyl)propionyloxymethyl]methane and 2,4,6-tris-(n-octadecylthiohexylthio)-1,3,5-triazine (g) 1,1,1-tris-[3'-(3'',5''-di-t-butyl-4'''-hydroxyphenyl)propionyloxymethyl]-propane and 2,4,6-tris-(n-hexylthioethylthioethylthio)-1,3,5-triazine (h) Di-n-octadecyl 1-(3'',5''-di-t-butyl-4''-hydroxyphenyl)-ethanephosphonate and 2,4,6-tris-(n-tetracosylthiohexylthio)-1,3,5-triazine (i) 1,2-propylene glycol bis-[3'-(3'',5''-di-t-butyl-4''-hydroxyphenyl)propionate and 2,4,6-tris(n-octadecylthiobutylthiobutylthio)-1,3,5-triazine (j) 4,4'-butylidene-bis(6-t-butyl-m-cresol) and 2,4,6-tris-(n-tetracosylthioethylthioethylthio)-1,3,5-triazine

EXAMPLE 12

A stabilized mineral oil composition is prepared by incorporating into a refined mineral oil of 183 S.U.S. at 100° F. (Regal Oil B, Texas Company) 0.005% by weight of 2,4,6-tris-(n-octylthioethylthio) - 1,3,5 - triazine. Even better stabilization is obtained when in combination with said triazine compound is used 6-(4'-hydroxy-3',5'-di-t-butylanilino)-2,4-bis(phenoxy)-1,3,5-triazine.

EXAMPLE 13

Stabilized lard is prepared by incorporating in lard 0.01% by weight of 2,4,6-tris-(n-tetradecylthioethylthio)-1,3,5-triazine.

Stabilized cotton seed oil is prepared when 0.01% by weight of this stabilizer is incorporated in a refined cotton seed oil.

EXAMPLE 14

Stabilized gasoline is prepared by incorporating into gasoline having no additives and no stabilizers therein, 0.05% by weight of 2,4,6-tris-(n-octadecylthioethylthio)-1,3,5-triazine. Stabilization is further improved by the addition of 0.02% by weight of 2,4-bis-(4'-hydroxy-3',5'-di - t - butylphenoxy)-6-(n - dodecylthioethylthio)-1,3,5-triazine.

EXAMPLE 15

Paraffin was (M.P. 125–128° F.) is stabilized by incorporating therein 0.001% by weight of 2,4,6-tris-(octylthioethylthioethylthio)-1,3,5-triazine. An improved stabilization is obtained when additionally 0.005% by weight of di-n-tetradecyl 3,5-di-t-butyl - 4 - hydroxybenzyl-phosphonate is added.

EXAMPLE 16

A stabilized high temperature lubrication oil is prepared by incorporating 2% by weight of 2,4,6-tris-(n-dodecylthioethylthio)-1,3,5-triazine into lubricant, which comprises diisoamyladipate. The stabilization of said lubricant is further improved by the addition of diethylene glycol bis-[3-(3'5'-di-t-butyl-4'-hydroxyphenyl)propionate].

EXAMPLE 17

High impact polystyrene resin containing elastomer (i.e., butadiene-styrene) is stabilized against loss of elongation properties by incorporation of 0.5% by weight of 2,4,6 - tris - (n-dodecylthioethylthioethylthio) - 1,3,5-triazine and 1.0% by weight of tetrakis-[3-(3',5'-di-t-butyl-4'-hydroxyphenylpropionyloxymethyl)]methane.

Similar results are obtained with terpolymer of acrylonitrile-butadiene-styrene.

EXAMPLE 18

A polyethylene composition is prepared by adding to polyethylene 0.2% by weight of carbon black, 0.3% by weight of 2,4,6-tris-(n-octadecylthioethylthioethylthio)-1,3,5-triazine and 0.1% by weight of dioctadecyl 3,5-di-t-butyl-4-hydroxybenzylphosphonate. The thus stabilized polyethylene exhibits much more stability than polyethylene containing only carbon black or carbon black with said phenolic stabilizer.

What is claimed is:

1. A triazine compound having the formula:

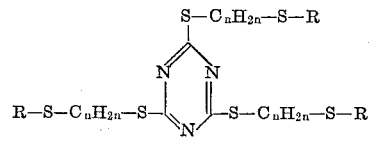

wherein
R is alkyl group having from 6 to 24 carbon atoms or —$C_mH_{2m}$—S—R', where m is from 2 to 6 and R' is alkyl group having from 6 to 24 carbon atoms, and n is an integer from 2 to 18.

2. A compound according to claim 1 wherein n is from 2 to 6.

3. A compound according to claim 1 wherein n is 2 and R is alkyl group having from 6 to 18 carbon atoms.

4. A compound according to claim 1 wherein n is from 2 to 6 and R is —$C_mH_{2m}$—S—R' where m is 2 and R' is alkyl group having from 6 to 18 carbon atoms.

5. A compound according to claim 1 wherein said triazine compound is 2,4,6-tris-(n-octylthioethylthio)-1,3,5-triazine.

6. A compound according to claim 1 wherein said triazine compound is 2,4,6-tris-(n-dodecylthioethylthio)-1,3,5-triazine.

7. A compound according to claim 1 wherein said triazine compound is 2,4,6-tris-(n-tetradecylthioethylthio)-1,3,5-triazine.

8. A compound according to claim 1 wherein said triazine compound is 2,4,6-tris-(n-octadecylthioethylthio)-1,3,5-triazine.

9. A compound according to claim 1 wherein said triazine compound is 2,4,6-tris(n-octylthioethylthioethylthio)-1,3,5-triazine.

References Cited

UNITED STATES PATENTS 3,245,992   4/1966   Dexter et al. _____ 260—248

JOHN M. FORD, Primary Examiner

U.S. Cl. X.R.

260—45.8 N; 252—402; 99—163